United States Patent [19]
Bahler et al.

[11] 3,899,796
[45] Aug. 19, 1975

[54] METACARPOPHALANGEAL JOINT

[75] Inventors: Andre Bahler; Norbert Gschwend; Heinrich Scheier, all of Zurich, Switzerland

[73] Assignee: Sulzer Brothers Limited, Winterthur, Switzerland

[22] Filed: June 27, 1974

[21] Appl. No.: 483,528

[30] Foreign Application Priority Data
July 19, 1973    Switzerland...................... 10544/73

[52] U.S. Cl. ................................. 3/1.91; 128/92 C
[51] Int. Cl.[2] .......................................... A61F 1/24
[58] Field of Search ................ 3/1, 1.9, 1.91, 1.911; 128/92 C, 92 CA

[56] References Cited
UNITED STATES PATENTS
3,506,982    4/1970    Steffee ......................................... 3/1
3,765,033    10/1973    Goldberg et al. ............................ 3/1
3,805,302    4/1974    Mathys ......................................... 3/1
3,837,009    9/1974    Walker ......................................... 3/1

Primary Examiner—Ronald L. Frinks
Attorney, Agent, or Firm—Kenyon & Kenyon Reilly Carr & Chapin

[57]    ABSTRACT

The bifurcated joint part has a slot-like aperture in which a second joint part is pivoted on a pivot pin. The side walls defining the aperture and the sides of the second joint part are shaped to permit sidewise pivoting of the second joint part to one side transverse to the plane of pivoting of the part about the pivot pin. This allows a gripping movement between a thumb and a finger of a hand in which the joint is used.

8 Claims, 3 Drawing Figures

METACARPOPHALANGEAL JOINT

This invention relates to a metacarpophalangeal joint.

Heretofore, hinging metacarpophalangeal joints have been known in which a first part of the joint is mounted in a slot-like aperture in a second joint part about a pivot pin so as to be rotatable approximately through a right angle. Also, each joint part generally has an intramedullary stem for implanting in a bone of the hand.

However, because of dislocations and malpositioning, more particularly of the kind occurring in polyarthritic deformation of the hands, patients often find it impossible, even after replacement of the metacarpophalangeal joints (MCP joints) by implants, to make a gripping movement between the thumb and the other fingers.

Accordingly, it is an object of this invention to provide an MCP joint implant wherein, when a finger is in the extended position, the finger can make an abduction movement radius-ad but cannot make an abduction movement ulna-ad.

Briefly, the invention provides a hinging metacarpophalangeal joint (hereinafter referred to as a MCP joint) comprised of a first joint part having a slot-like aperture, a pivot pin secured in the first joint part across the aperture and a second joint part which is pivotally mounted on the pivot pin for pivoting in a plane transverse to the pivot pin and through an approximately right angle. Each joint part has an intramedullary stem, for example for implanting purposes. In addition, the first joint part has a pair of opposed side walls defining the slot while the second joint part has a pair of opposite sides each facing a side wall. These sides and side walls are shaped to permit pivoting of the second joint part towards one of the side walls in a direction transverse to the plane in which the second joint part pivots on the pin when the stem of the second joint part is extended in a direction axial of the stem of the first joint part. In this way, a finger in which the second joint part is implanted can pivot towards a thumb.

The pivot pin is secured in any suitable manner in the first joint part to extend from one side wall to the other.

Since the fingers of any hand must be capable of movement towards the thumb with virtually no pivoting movement in the opposite direction, the MCP joint must be constructed differently for the right hand and for the left hand.

In order to simulate the possible motions of a natural MCP joint to a high degree, the aperture defining side walls in the first joint part and the corresponding sides of the second joint part are of a shape such that as the joint bends, the pivoting movement experiences a gradual and continuously increasing limitation. Preferably, one side wall of the slot-like aperture in the first joint part is inclined relative to the pivot pin in a direction outwardly of the aperture, i.e., the side wall extends outwardly from the aperture end near the intramedullary stem. The other side wall is perpendicular to the pivot pin. In this case, the inclined side wall of the slot-like aperture can be a plane surface which forms a wedge-shaped aperture with the other side wall.

Advantageously, to prevent overstretching of the fingers, the aperture in the first joint part is closed on the top.

The MCP joint is made preferably of the metals and/or metal alloys customary in the implant art but can also be made of plastics, such as polyethylene or polyester, or ceramic.

These and other objects and advantages of the invention will become more apparent from the following detailed description and appended claims taken in conjunction with the accompanying drawings in which:

Figure 1:
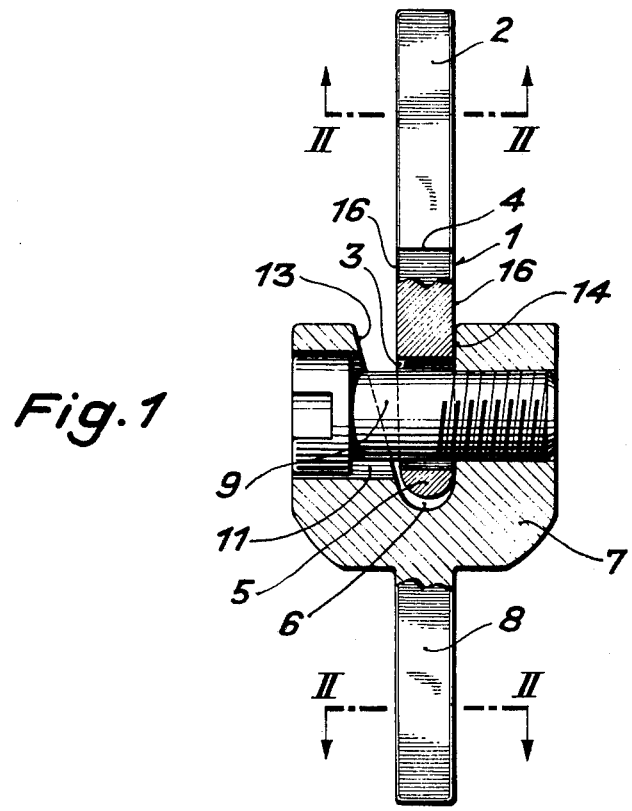
FIG. 1 illustrates a plan view and partly in a section taken on line I—I of FIG. 3 of a complete MCP joint according to the invention as implanted in a hand with a finger in the extended position.
Figure 2:
FIG. 2 illustrates a view taken on line II—II of FIG. 1.

Referring to FIG. 1, the MCP joint, which is an ordinary hinge, comprises a joint part 1 which has a rectangular cross-section intramedullary stem 2 (FIG. 2) extending therefrom and which is formed with a passage 3 within a head 5. This joint part 1 is inserted as an implant in the phalanx contiguous to the MCP joint. The depth to which the part 1 can penetrate into the digital phalanx is limited by an abutment 4 between the stem 2 and the head 5.

As shown, the head 5 has an outer periphery which is of circular cross-section for purposes as explained below.

The joint also has a bifurcated joint part 7 which has a pair of opposed side walls 13, 14 defining a slot-like aperture 6. In addition, a screwthreaded pivot pin 9 is secured in the joint part 7 to extend across the aperture 6 from one wall 13 to the other wall 14. To this end, each prong of the joint part 7 is formed with a bore 11, 12 to threadably receive the pin 9. The joint part 7 also has an intramedullary stem 8 adapted to be anchored in a metacarpal bone.

The two joint parts 1, 7 can be anchored in a bone, for example, by means of bags or linings or the like, in which the stems 2, 8 are a snug fit.

The joint part 7 also has a socket of circular cross-section in the base of the aperture 6 to receive the head 5 of the joint part 1.

The side walls 13, 14 are shaped so that, apart from pivoting of the joint part 1 about the pivot pin 9, the joint part 1 can pivot laterally to only one side as viewed in FIG. 1. To this end, one wall 13 is inclined relative to the pivot pin 9 in a direction outwardly of the aperture 6 while the other wall 14 is disposed in perpendicular relation to the pivot pin 9. The wall 13 widens outwardly in a V-fashion so that the two walls 13, 14 form a wedge-shaped aperture 6. The sides of the joint part 1 opposite these walls 13, 14 are flat and are in planes perpendicular to the pivot pin 9.

Alternatively, the side walls 13, 14 can of course be disposed parallel to one another and perpendicular to the pivot pin 9 and one of the outside surfaces 16 of the joint part 1 can be formed with an appropriate recess. Also, the side walls 13, 14 can both widen in V-fashion and a single outside surface 16 of the part 1 can have a corresponding projection.

The shape, position and size of the head 5, passage 3 and bores 11, 12 and the depth and shape of the socket in the base of the aperture 6 are so adapted to one another that the head 5 bears in the socket at the base of aperture 6 but the passage 3 extends around the pin 9 with clearance.

Due to the facility of being pivotal in a direction transverse to the plane of pivoting about the pivot pin 9, the MCP joint enables a finger, when extended, to make a lateral movement, to the left in the example shown. However, movement in the opposite direction is virtually impossible. As the finger is bent, the possibility of lateral movement to the left becomes increasingly restricted since the head 5 gradually moves into narrower zones of the wedge-shaped aperture 6.

Figure 3:
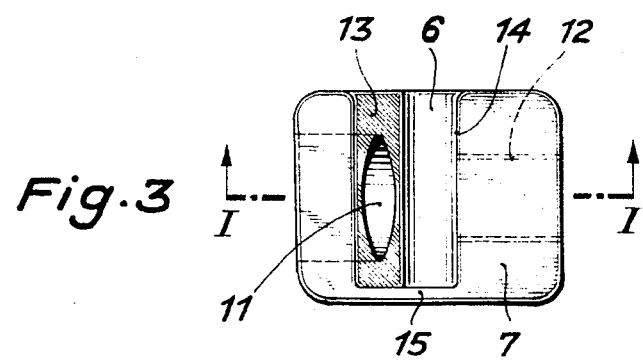
FIG. 3 illustrates a plan view of one of the joint parts of FIG. 1.

As the plan view of FIG. 3 shows, the aperture 6 is closed at the top — as considered with the joint in the proper position for operation — by a connecting member 15 between the two prongs, i.e., side walls 13, 14 of the joint part 7, so that the fingers cannot be overstretched.

FIG. 1 is a plan view looking on to the back of a hand. As previously stated, since it is required to have an abduction movement of the fingers towards the thumb, the joint shown is for a right hand. The construction must be laterally inverted for the left hand.

What is claimed is:

1. A hinging metacarpophalangeal joint comprising
a first joint part having a pair of opposed side walls defining a slot-like aperture therein and an intramedullary stem extending therefrom;
a pivot pin secured in said first joint part across said aperture from one side wall to the other side wall;
a second joint part pivotally mounted on said pivot pin for pivoting in a plane transverse to said pivot pin through an approximately right angle, said second joint part having an intramedullary stem extending therefrom and a pair of opposite sides each facing a respective one of said side walls of said first joint part, said sides and said side walls being shaped to permit pivoting of said second joint part towards only one of said side walls in a first direction transverse to said plane with said stem of said second joint part extended in a direction axial of said stem of said first joint part.

2. A hinging metacarpophalangeal joint comprising
a first joint part having a pair of opposed side walls defining a slot-like aperture therein and an intramedullary stem extending therefrom;
a pivot pin secured in said first joint part across said aperture from one side wall to the other side wall;
a second joint part pivotally mounted on said pivot pin for pivoting in a plane transverse to said pivot pin through an approximately right angle, said second joint part having an intramedullary stem extending therefrom and a pair of opposite sides each facing a respective one of said side walls of said first joint part, said sides and said side walls being shaped to permit pivoting of said second joint part towards only one of said side walls in a first direction transverse to said plane with said stem of said second joint part extending in a direction axial of said stem of said first joint part;
said sides and said side walls being shaped to increasingly limit pivoting of said second joint part transverse to said plane for positions of said second joint part stem displaced from said axial direction.

3. A hinging metacarpophalangeal joint comprising
a first joint part having a pair of opposed side walls defining a slot-like aperture therein and an intramedullary stem extending therefrom;
a pivot pin secured in said first joint part across said aperture from one side wall to the other side wall;
a second joint part pivotally mounted on said pivot pin for pivoting in a plane transverse to said pivot pin through an approximately right angle, said second joint part having an intramedullary stem extending therefrom and a pair of opposite sides each facing a respective one of said side walls of said first joint part, said sides and said side walls being shaped to permit pivoting of said second joint part towards one of said side walls in a first direction transverse to said plane with said stem of said second joint part extending in a direction axial of said stem of said first joint part;
one of said side walls being perpendicular to said pivot pin and the other of said side walls being inclined relative to said pivot pin in a direction outwardly of said aperture.

4. A joint as set forth in claim 3 wherein said inclined side wall is a plane surface and forms a wedge-shaped aperture with said one side wall.

5. A joint as set forth in claim 1 wherein said first joint part has a connecting member extending between said side walls to limit pivoting of said second joint part in one direction of said transverse plane.

6. A hinging metacarpophalangeal joint comprising
a pivot pin;
a bifurcated first joint part having a pair of opposed side walls defining a slot-like aperture therein, said pivot pin being secured in said walls and extending across said aperture, one of said walls being disposed in perpendicular relation to said pivot pin and the other of said walls being inclined relative to said pivot pin in a direction outwardly of said aperture, and an intramedullary stem extending therefrom; and
a second joint part pivotally mounted on said pivot pin for pivoting in a plane transverse to said pivot pin through an approximately right angle, said second joint part having a passage surrounding said pin in spaced relation to permit pivoting of said second joint part in a direction transveser to said plane and towards said inclined wall, said second joint part having an intramedullary stem extending therefrom.

7. A joint as set forth in claim 6 wherein said first joint part has a connecting member extending between said side walls to limit pivoting of said second joint part in one direction of said transverse plane.

8. A joint as set forth in claim 6 wherein said second joint part has a head of circular cross-section about said passage and said first joint part has a socket of circular cross-section in a base of said aperture for receiving said head.

* * * * *